US012564125B2

(12) United States Patent
Barker

(10) Patent No.: US 12,564,125 B2
(45) Date of Patent: Mar. 3, 2026

(54) ENCAPSULATED SEED PLANTING DEVICE

(71) Applicant: Deere & Company, Moline, IL (US)

(72) Inventor: Mark E. Barker, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 383 days.

(21) Appl. No.: 18/450,732

(22) Filed: Aug. 16, 2023

(65) Prior Publication Data

US 2025/0057072 A1     Feb. 20, 2025

(51) Int. Cl.
*A01C 1/04*          (2006.01)
*A01C 14/00*         (2006.01)
*A01G 9/029*         (2018.01)

(52) U.S. Cl.
CPC .............. *A01C 14/00* (2013.01); *A01C 1/046* (2013.01); *A01G 9/0293* (2018.02)

(58) Field of Classification Search
CPC ........ A01C 1/046; A01C 14/00; A01G 9/0293
See application file for complete search history.

(56) References Cited

U.S. PATENT DOCUMENTS

| | | | |
|---|---|---|---|
| 11,818,977 B2 | 11/2023 | Anderson et al. | |
| 12,213,400 B2 | 2/2025 | Anderson et al. | |
| 12,245,543 B2 | 3/2025 | Barker | |
| 12,356,884 B2 | 7/2025 | Barker et al. | |
| 2005/0241553 A1* | 11/2005 | Dika | A01C 7/18 |
| | | | 111/170 |
| 2010/0263274 A1* | 10/2010 | Corak | A01H 4/006 |
| | | | 47/57.6 |
| 2019/0116719 A1* | 4/2019 | Fletcher | B64D 1/16 |
| 2020/0128724 A1* | 4/2020 | Stoller | A01C 7/06 |

OTHER PUBLICATIONS

Water Soluble Seed Tape, pp. 1-3, [online]. Retrieved from the Internet <URL: https://cn-neoglobal.com/products/water-soluble-new-products/water_soluble_seed_tape.html>.

* cited by examiner

*Primary Examiner* — Matthew R Buck

(57)          ABSTRACT

An encapsulated seed planting device for planting a seed that is encapsulated in a water soluble cover. The encapsulated seed planting device comprises a frame and a support device for supporting the frame above a surface. A planting unit is provided that comprises a cartridge for receiving the seed. A compression device is coupled to the cartridge for holding the seed. A piston is positioned in a facing relationship with the cartridge. The piston is configured to push the seed out of the cartridge and into the surface. A cylinder is positioned in a facing relationship with the piston. The cylinder is configured to move the piston. A control device is provided for controlling operation of the cylinder.

12 Claims, 9 Drawing Sheets

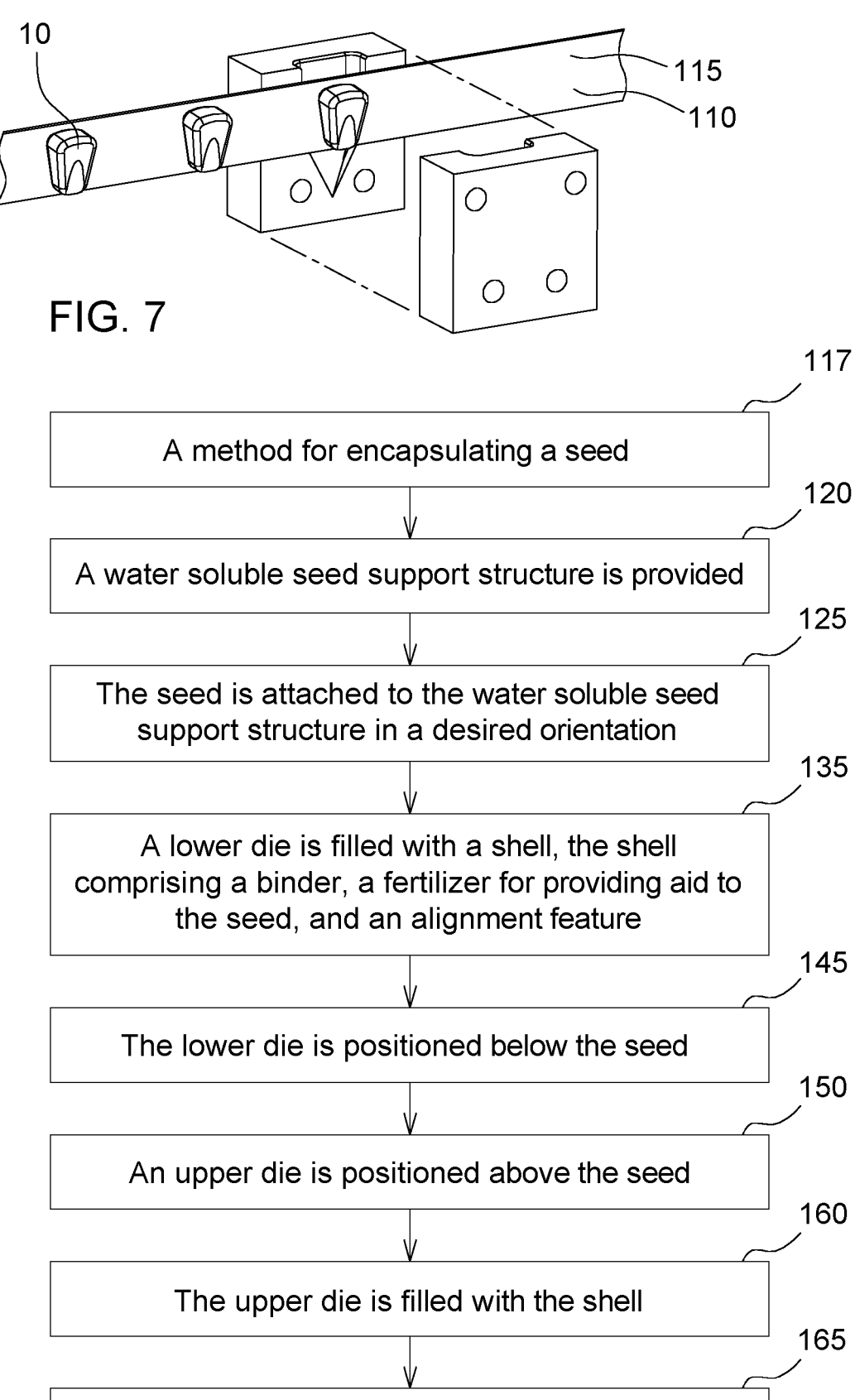

| A method for encapsulating a seed |

120

| A water soluble seed support structure is provided |

125

| The seed is attached to the water soluble seed support structure in a desired orientation |

135

| A lower die is filled with a shell, the shell comprising a binder, a fertilizer for providing aid to the seed, and an alignment feature |

145

| The lower die is positioned below the seed |

150

| An upper die is positioned above the seed |

160

| The upper die is filled with the shell |

165

| The lower die and the upper die are removed |

FIG. 8

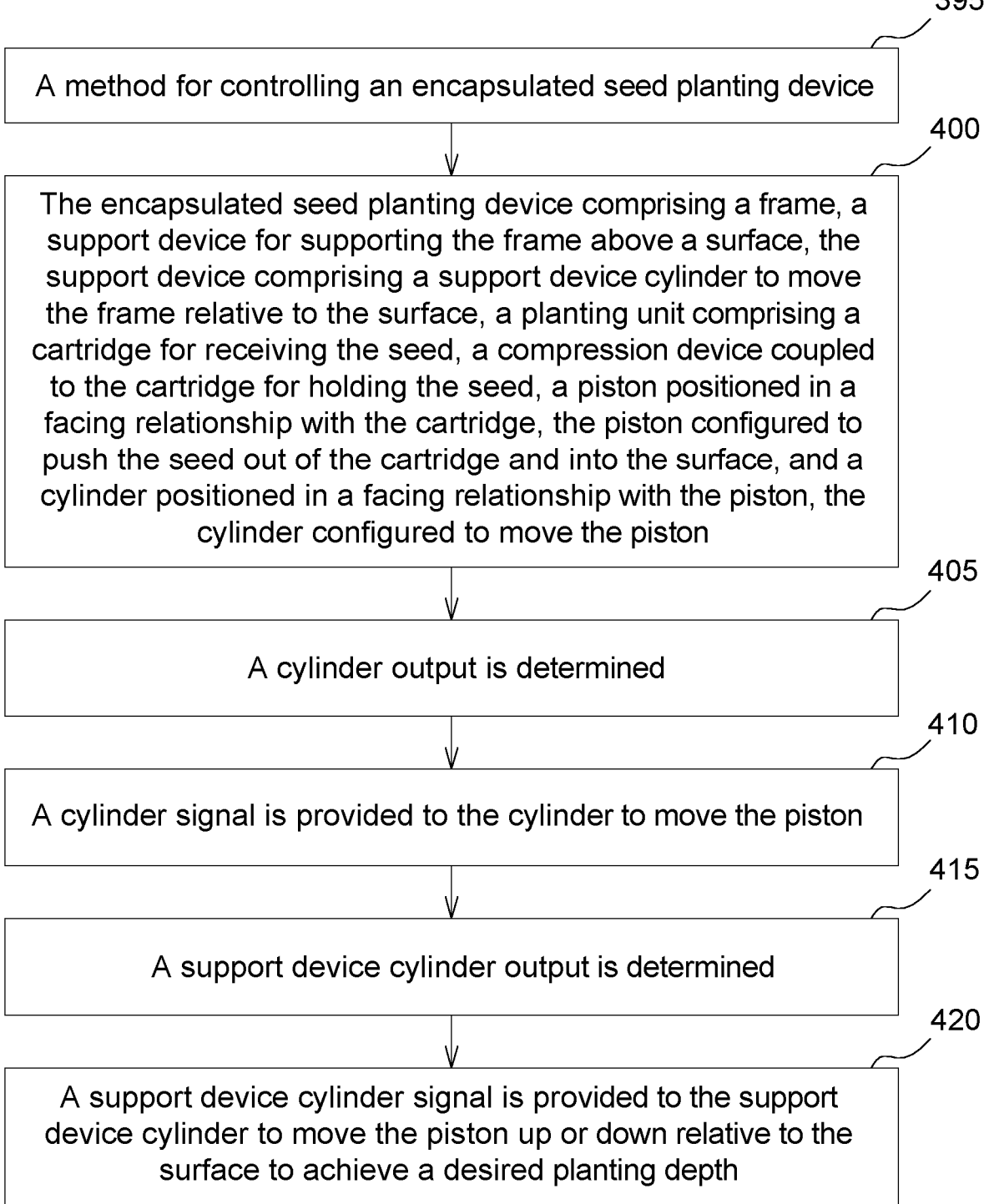

395

A method for controlling an encapsulated seed planting device

400

The encapsulated seed planting device comprising a frame, a support device for supporting the frame above a surface, the support device comprising a support device cylinder to move the frame relative to the surface, a planting unit comprising a cartridge for receiving the seed, a compression device coupled to the cartridge for holding the seed, a piston positioned in a facing relationship with the cartridge, the piston configured to push the seed out of the cartridge and into the surface, and a cylinder positioned in a facing relationship with the piston, the cylinder configured to move the piston

405

A cylinder output is determined

410

A cylinder signal is provided to the cylinder to move the piston

415

A support device cylinder output is determined

420

A support device cylinder signal is provided to the support device cylinder to move the piston up or down relative to the surface to achieve a desired planting depth

FIG. 16

ENCAPSULATED SEED PLANTING DEVICE

FIELD OF THE DISCLOSURE

The present disclosure generally relates to encapsulated seeds and more particularly to a device and method for planting encapsulated seeds.

BACKGROUND OF THE DISCLOSURE

In order to plant seeds with a particular orientation in the ground, currently an operator would have to manually position the seed in the ground by hand.

SUMMARY OF THE DISCLOSURE

In one embodiment, an encapsulated seed planting device for planting a seed that is encapsulated in a water soluble cover is disclosed. The encapsulated seed planting device comprises a frame and a support device for supporting the frame above a surface. A planting unit is provided that comprises a cartridge for receiving the seed. A compression device is coupled to the cartridge for holding the seed. A piston is positioned in a facing relationship with the cartridge. The piston is configured to push the seed out of the cartridge and into the surface. A cylinder is positioned in a facing relationship with the piston. The cylinder is configured to move the piston. A control device is provided for controlling operation of the cylinder.

In another embodiment, an encapsulated seed planting device for planting a seed that is encapsulated in a water soluble cover is disclosed. The encapsulated seed planting device comprises a frame and a support device for supporting the frame above a surface. The support device comprises a support device cylinder to move the frame relative to the surface. A planting unit is provided that comprises a cartridge for receiving the seed. A compression device is coupled to the cartridge for holding the seed. A piston is positioned in a facing relationship with the cartridge. The piston is configured to push the seed out of the cartridge and into the surface. A cylinder is positioned in a facing relationship with the piston. The cylinder is configured to move the piston. A control device for controlling operation of the cylinder and the support device cylinder is provided. The control device comprises a data storage device and an electronic data processor. The data storage device is configured for storing instructions that are executable by the electronic data processor to cause the electronic data processor to determine a cylinder output and provide a cylinder signal to the cylinder to move the piston and to determine a support device cylinder output and provide a support device cylinder signal to the support device cylinder to move the piston up or down relative to the surface to achieve a desired planting depth.

In yet another embodiment, a method for controlling an encapsulated seed planting device is disclosed. The encapsulated seed planting device comprises a frame, a support device for supporting the frame above a surface, the support device comprising a support device cylinder to move the frame relative to the surface, a planting unit comprising a cartridge for receiving the seed, a compression device coupled to the cartridge for holding the seed, a piston positioned in a facing relationship with the cartridge, the piston configured to push the seed out of the cartridge and into the surface, and a cylinder positioned in a facing relationship with the piston, the cylinder configured to move the piston. The method comprises determining a cylinder output. The method further comprises providing a cylinder signal to the cylinder to move the piston. The method comprises determining a support device cylinder output. The method further comprises providing a support device cylinder signal to the support device cylinder to move the piston up or down relative to the surface to achieve a desired planting depth.

Other features and aspects will become apparent by consideration of the detailed description and accompanying drawings.

BRIEF DESCRIPTION OF THE DRAWINGS

FIG. 7 is a perspective view of a water soluble seed support structure;

FIG. 8 is a flow diagram of a method of encapsulating a seed;

FIG. 16 a flow diagram of a method for controlling an encapsulated seed planting device.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figures 1, 2, 3, 4, 5:
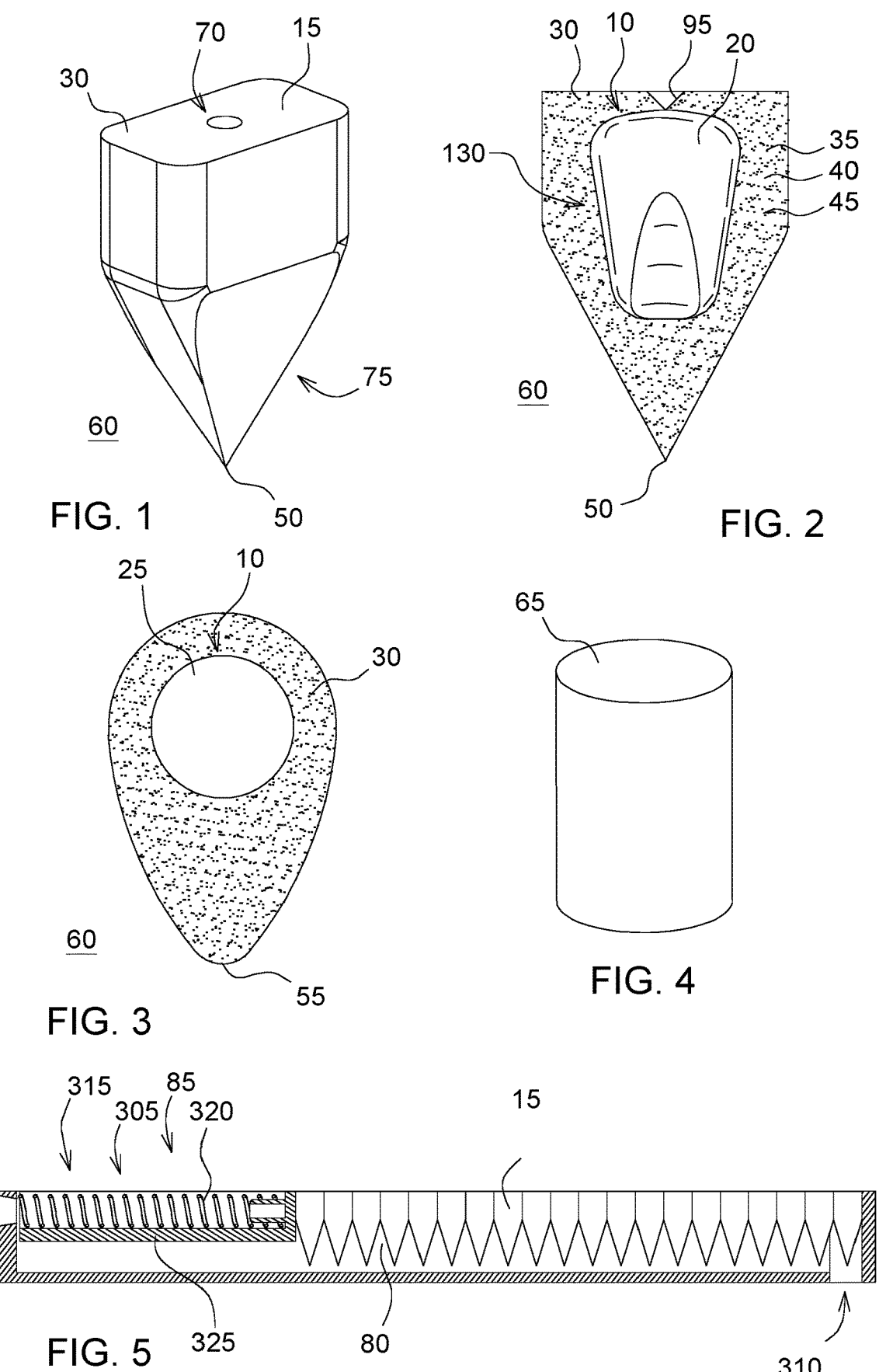
FIG. 1 is a perspective view of an encapsulated seed according to one embodiment.
FIG. 2 is a cut away view of the encapsulated seed according to the embodiment of FIG. 1.
FIG. 3 is a cut away view of an encapsulated seed according to another embodiment.
FIG. 4 is a cut away view of an encapsulated seed according to yet another embodiment.
FIG. 5 is a side view of a cartridge of an encapsulated seed planter.

FIGS. 1 and 2 illustrate a seed 10 that has been encapsulated and thus form an encapsulated seed 15. The encapsulation may provide many benefits to the seed 10 including orienting the seed 10 in a specific direction or orientation for planting, providing nutrients for the seed 10, protecting the seed 10 from the weather, and providing other benefits. The encapsulated seed 15 may be a corn seed 20, or a soybean seed 25, or another type of seed 10.

The seed 10 may be partially or fully encapsulated by a shell 30 that may be added or applied to the seed 10. The shell 30 may comprise a binder 35 as a main material for orienting and holding the seed in a desired position relative to the shell 30. A fertilizer 40 or other chemical 45 may be included or mixed with the binder 35 for providing aid to the seed 10 or to enable seed germination and early plant growth.

With continued reference to FIGS. 1 and 2, the shell 30 may comprise a shape with a point 50 or narrow end 55 (FIG. 3) that points towards a surface 60 or ground. The point 50 may be configured to aid in more easily allowing the encapsulated seed to be pushed into or under the surface 60 for planting. Alternatively, the shell 30 may comprise a cylindrical shape 65 (FIG. 4) or other shape configured to aid in orienting the seed 10 in the desired position relative to the shell 30.

Figure 6:
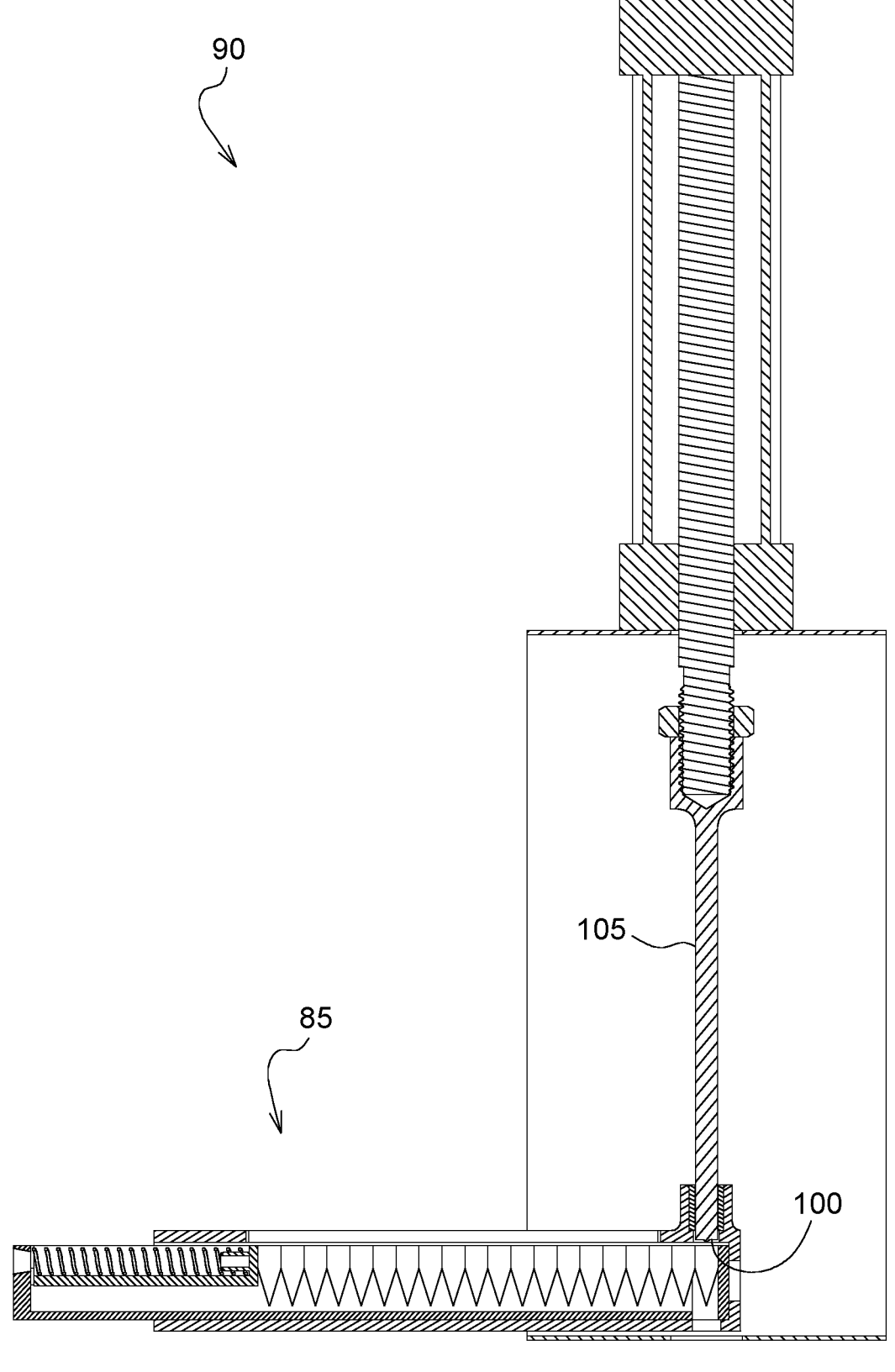
FIG. 6 is a cut away view of a portion of an encapsulated seed planter.

The shell 30 may comprise an alignment feature 70. The alignment feature 70 may comprise a complementary shape 75 with an interior shape 80 of a cartridge 85 configured for holding the encapsulated seed 15 in the desired orientation relative to the surface 60 until the encapsulated seed 15 is planted in or under the surface 15 by an encapsulated seed planter 90 (FIG. 6). Referring to FIGS. 1, 2, and 6, the alignment feature 70 may comprise an aperture 95 that is complementary to a protrusion 100 from a piston 105 of the encapsulated seed planter 90. The piston 105 may be configured to push the encapsulated seed 15 into or under the surface 60 for planting by aligning the protrusion 100 with the aperture 95.

With reference to FIG. 7, in another embodiment, the seed 10 may be attached to a water soluble seed support structure 110 and then encapsulated to form the encapsulated seed 15. The water soluble seed support structure 110 may comprise a belt 115 or a tape. The water soluble seed support structure 110 may be placed in or under the surface 60 for planting. In time, the water soluble seed support structure 110 will dissolve or otherwise disintegrate.

Figures 9, 10:
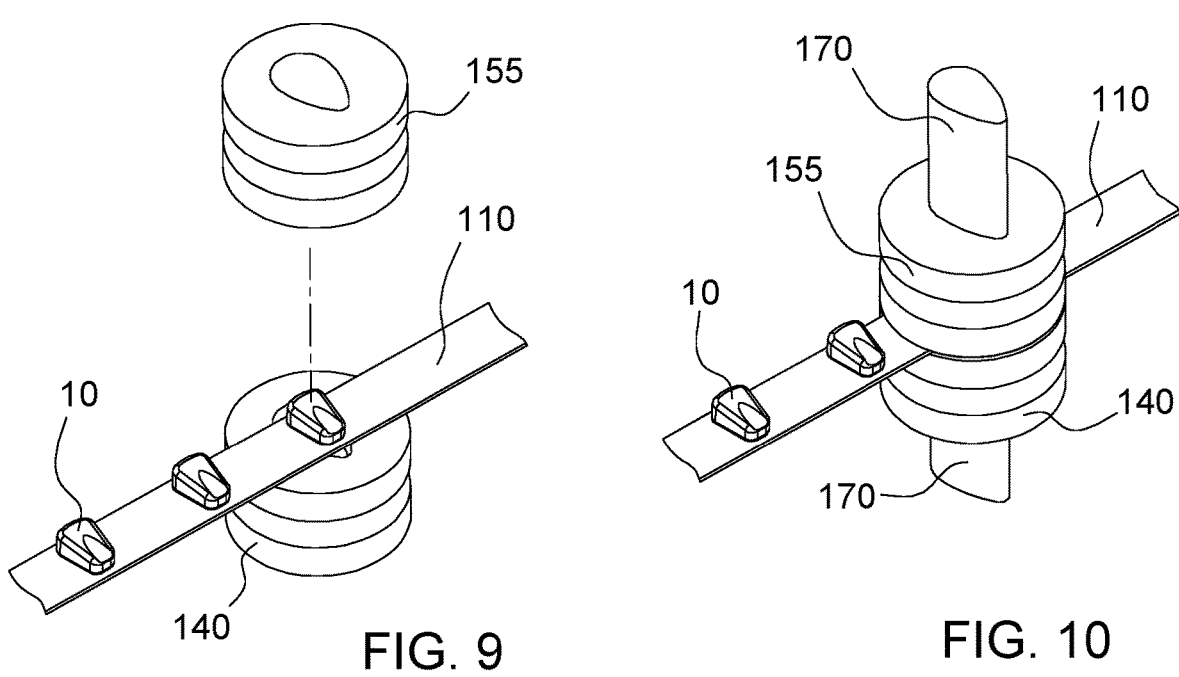
FIG. 9 is a perspective view of a lower die and a water soluble seed tape.
FIG. 10 is a perspective view of a lower die, an upper die, and a water soluble seed tape.

Referring to FIG. 8, a flow diagram of a method 117 for encapsulating a seed 10 is provided. With additional reference to FIGS. 9 and 10, at 120, a water soluble seed support structure 110 is provided. At 125, the seed 10 is attached to the water soluble seed support structure 110 in a desired orientation 130 (FIG. 2). At 135, a lower die 140 is filled with a shell 30 or a shell material. The shell 30 may comprise a binder 35, a fertilizer 40 for providing aid to the seed 10, and an alignment feature 70. At 145, the lower die 140 is positioned below the seed 10. At 150, an upper die 155 is positioned above the seed 10. At 160, the upper die 155 is filled with the shell 30. At 165, the shell 30 may be compressed with a punch 170 and the lower die 140 and the upper die 155 are removed.

Figure 11:
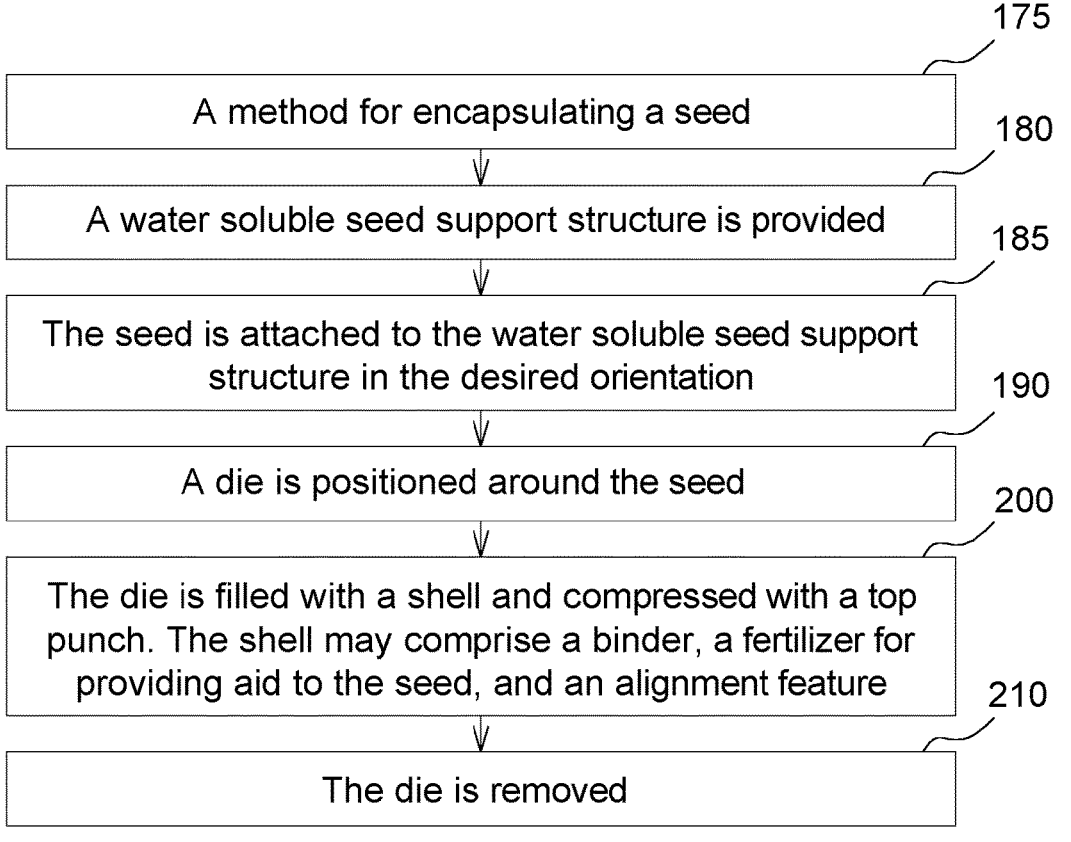
FIG. 11 is a flow diagram of another method of encapsulating a seed.
Figure 12:
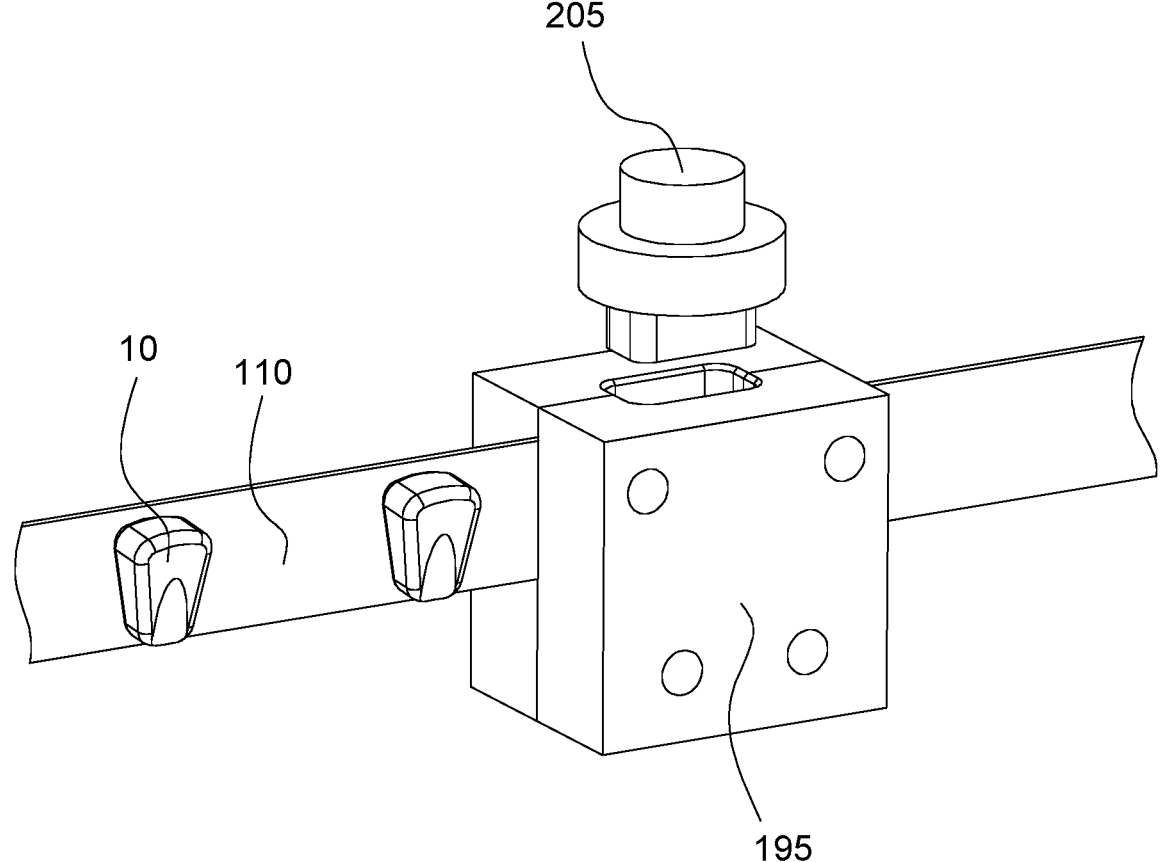
FIG. 12 is a perspective view of a die and a water soluble seed tape according to another embodiment.

With reference to FIG. 11, a flow diagram of an alternative method 175 for encapsulating a seed 10 is provided. With additional reference to FIG. 12, at 180, a water soluble seed support structure 110 is provided. At 185, the seed 10 is attached to the water soluble seed support structure 110 in the desired orientation 130. At 190, a die 195 is positioned around the seed 10. At 200, the die 195 is filled with a shell 30 and compressed with a top punch 205. The shell 30 may comprise a binder 35, a fertilizer 40 for providing aid to the seed 30, and an alignment feature 70. At 210, the die 195 is removed.

Figure 13:
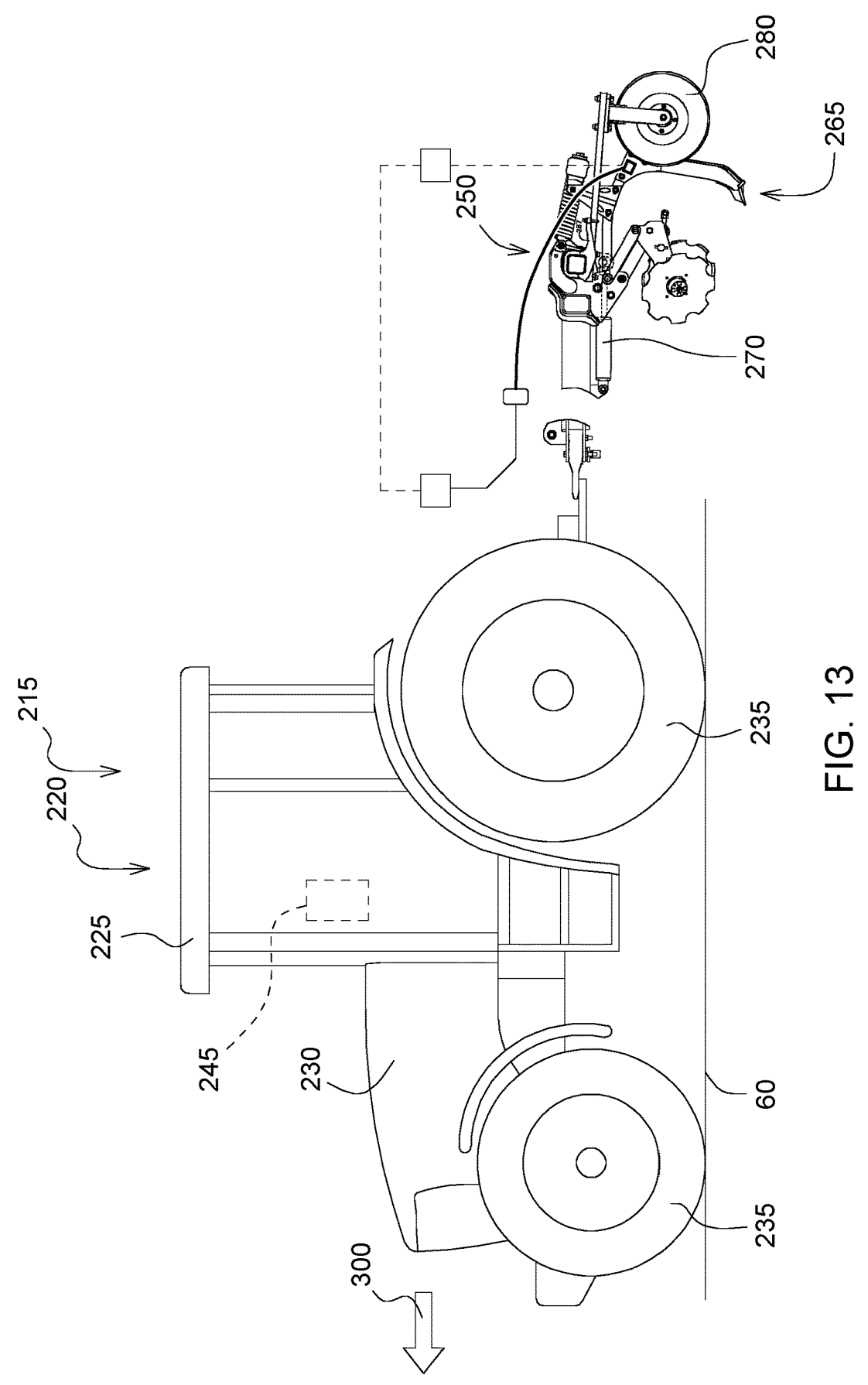
FIG. 13 is a side view of an agricultural work vehicle and an implement.

Referring to FIG. 13, an agricultural work vehicle 215, for example a tractor 220 is shown. The agricultural work vehicle 215 can include an operator station 225 or cab, a hood 230, one or more ground engaging apparatus 235, for example wheels or track assemblies, and a vehicle frame 240 or chassis. The agricultural work vehicle 215 can have a rigid or an articulated vehicle frame 240. The agricultural work vehicle 215 can include one or more power sources, for example an internal combustion engine, a hybrid engine, or an electric or hydraulic motor. The agricultural work vehicle 215 can include an operator interface 245 having any number and combination of electronic devices, such as an interactive display for providing and receiving information and instructions to and from an operator. The agricultural work vehicle 215 can also include a suspension system.

Figure 14:
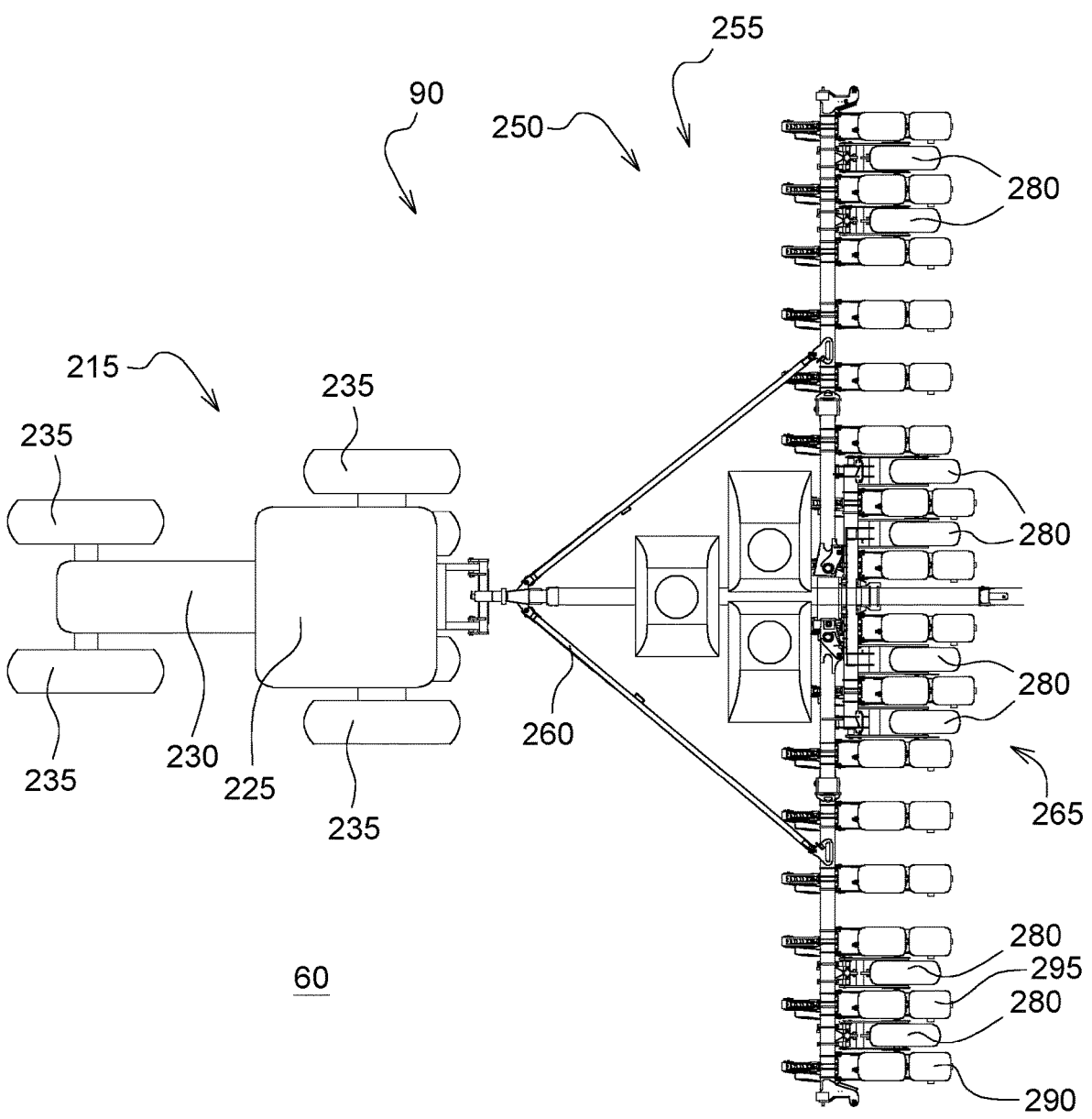
FIG. 14 is a top view of an agricultural work vehicle and an implement.

With reference to FIG. 14, an implement 250 is coupled to the agricultural work vehicle 215. The implement 250 may be an encapsulated seed planting device 255 or encapsulated seed planter 90 for planting a seed 10 such as an encapsulated seed 15 that is encapsulated in a water soluble cover or shell 30. The encapsulated seed planting device 255 may comprise a frame 260 and a support device 265 for supporting the frame 260 above a surface 60. The support device 265 may comprise a support device cylinder 270 (FIG. 13) to move the frame 260 or a piston 105 of the encapsulated seed planting device 255 relative to the surface 60. The support device cylinder 270 may be a hydraulic, electric, or pneumatic cylinder. The support device cylinder 270 is configured to receive electronic or wireless signals and operate according to the signal. The support device 265 may also comprise at least one wheel 280 that is moved by the support device cylinder 270 to move the frame 260 or the piston 105 relative to the surface 60.

The encapsulated seed planting device 255 may comprise at least one planting unit 285. For example, the planting unit 285 may be a first planting unit 290 and the encapsulated seed planting device 255 may further comprise at least a second planting unit 295. The first planting unit 290 and the second planting unit 295 may be positioned colinearly in a direction of travel 300 (FIG. 13) and plant seeds 10 in the same row or they may be positioned adjacent to one another. In addition, the encapsulated seed planting device 255 may have three or more planting units 285 for planting more encapsulated seeds 15 or other seeds 10 at one time.

Referring to FIG. 5, the planting unit 285 may comprise a cartridge 85 for receiving the encapsulated seed 15. The cartridge 85 may comprise a receiving portion 305 for receiving the encapsulated seed 15 and an exit portion 310 for the piston 105 to remove the encapsulated seed 15 from the cartridge 85. The cartridge 85 may be configured to receive more than one encapsulated seed 15. The cartridge 85 may be configured to orient the encapsulated seed 15 so the planting unit 285 can plant the encapsulated seed 15 in a desired orientation 130.

A compression device 315 may be coupled to the cartridge 85 for holding the encapsulated seed 15. The compression device 315 may comprise a spring 320. Alternatively, the compression device 315 may comprise a cylinder (not shown) such as a hydraulic, electric, or pneumatic cylinder. A guide 325 may be positioned in a facing relationship with the compression device 315 to guide the compression device 315 in the cartridge 85 in order to keep the next encapsulated seed 15 in a ready to plant position 330 where the encapsulated seed 15 is near the exit portion 310.

With reference to FIG. 6, the piston 105 may be positioned in a facing relationship with the cartridge 85. The piston 105 may be configured to push the encapsulated seed 15 out of the cartridge 85 and into the surface 60 for planting. A cylinder 335 may be positioned in a facing relationship with the piston 105. The cylinder 335 may be configured to move the piston 105. The cylinder 335 may be a hydraulic, electric, or pneumatic cylinder 335. The cylinder 335 is configured to receive electronic or wireless signals and extend or retract or otherwise operate or move according to the signal.

Figure 15:
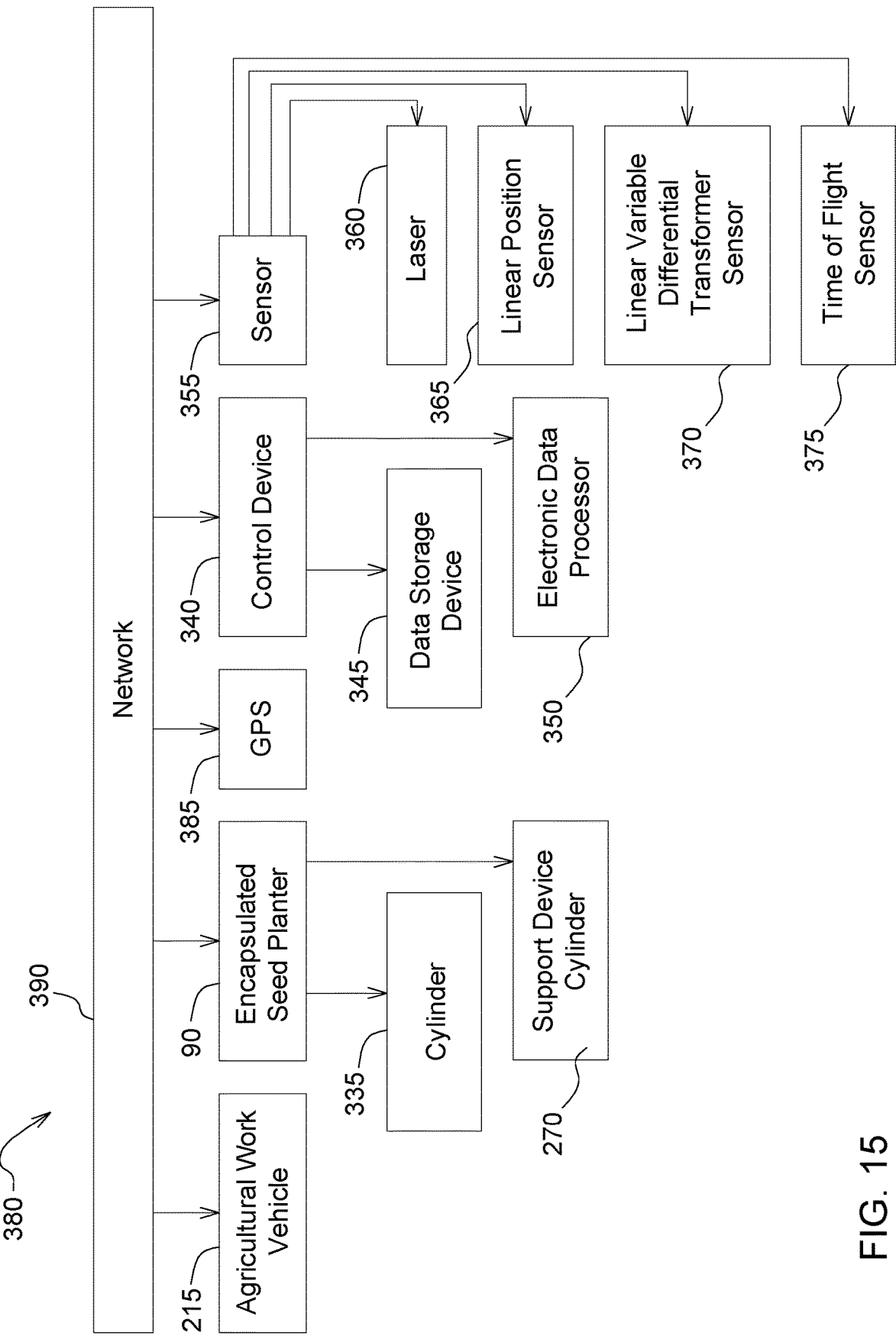
FIG. 15 is a block diagram of a computing architecture.

Referring to FIG. 15, a control device 340 may be provided to control operation of the cylinder 335. The control device 340 may comprise a data storage device 345 and an electronic data processor 350. The data storage device 345 may be configured for storing instructions that are executable by the electronic data processor 350 to cause the electronic data processor 350 to determine a cylinder output and provide a cylinder signal to the cylinder 335 to move the piston 105 and to determine a support device cylinder output and provide a support device cylinder signal to the support device cylinder 270 to move the piston 105 up or down relative to the surface 60 to achieve a desired planting depth.

A sensor 355 may be in communication with the control device 340. The sensor 355 may comprise a laser 360. Alternatively, the sensor 355 may comprise any linear position sensor 365 including linear variable differential transformer sensors 370 and time of flight sensors 375. The sensor 355 may be configured for measuring the height of the piston 105 relative to the surface 60 and/or relative to any part of the encapsulated seed planter 90 to measure an actual planting depth. The control device 340 can then compare the actual planting depth with the desired planting depth and adjust the cylinder 335 or the support device cylinder 270 to minimize any error.

With continued reference to FIG. 15, a block diagram is provided of one example of a computing architecture 380 that includes the agricultural work vehicle 215, the encapsulated seed planter 90, a global positioning system ("GPS") 385, the control device 340, and the sensor 355. The GPS 385 may comprise a Global Navigation Satellite System (GNSS), a terrestrial radio triangulation system, or any other system which is able to provide the location of the agricultural work vehicle 215 in a field in global or local coordinates. The agricultural work vehicle 215, the encapsulate seed planter 90, the GPS 385, the control device 340, and the sensor 355 are connected over a network 390. Thus, computing architecture 380 operates in a networked environment, where the network 390 includes any of a wide variety of different logical connections such as a local area network (LAN), wide area network (WAN), controller area network (CAN) near field communication network, satellite communication network, cellular networks, or a wide variety of other networks or combination of networks. It is also noted that the control device 340 can be deployed on the agricultural work vehicle 215 such that the control device 340 performs the operations described herein without a networked connection such as via a wired connection.

Referring to FIG. 16, a flow diagram of a method 395 for controlling an encapsulated seed planting device 255 is provided. At 400, the encapsulated seed planting device 255 comprises a frame 260, a support device 265 for supporting the frame 260 above a surface 60, the support device 265 comprises a support device cylinder 270 to move the frame 260 relative to the surface 60, a planting unit 285 comprises a cartridge 85 for receiving the seed 10, a compression device 315 is coupled to the cartridge 85 for holding the seed 10, a piston 105 is positioned in a facing relationship with the cartridge 85, the piston 105 is configured to push the seed 10 out of the cartridge 85 and into the surface 60 for planting, and a cylinder 335 is positioned in a facing relationship with the piston 105, the cylinder 335 is configured to move the piston 105.

At 405, a cylinder output is determined. At 410, a cylinder signal is provided to the cylinder 335 to move the piston 105. At 415, a support device cylinder output is determined. At 420, a support device cylinder signal is provided to the support device cylinder 270 to move the piston 105 up or down relative to the surface 60 to achieve a desired planting depth.

Various features are set forth in the following claims.

What is claimed is:

1. An encapsulated seed planting device for planting a seed that is encapsulated in a water soluble cover, the encapsulated seed planting device comprising:
   a frame;
   a support device for supporting the frame above a surface;
   a planting unit comprising:
      a cartridge for receiving the seed;
      a compression device coupled to the cartridge for holding the seed;
      a piston positioned in a facing relationship with the cartridge, the piston configured to push the seed out of the cartridge and into the surface; and
      a cylinder positioned in a facing relationship with the piston, the cylinder configured to move the piston; and
   a control device for controlling operation of the cylinder;
   wherein the support device comprises a support device cylinder to move the piston relative to the surface.

2. The encapsulated seed planting device of claim 1, wherein the control device comprises a data storage device and an electronic data processor, the data storage device configured for storing instructions that are executable by the electronic data processor to cause the electronic data processor to determine a cylinder output and provide a cylinder signal to the cylinder to move the piston and to determine a support device cylinder output and provide a support device cylinder signal to the support device cylinder to move the piston up or down relative to the surface to achieve a desired planting depth.

3. An encapsulated seed planting device for planting a seed that is encapsulated in a water soluble cover, the encapsulated seed planting device comprising:
   a frame;
   a support device for supporting the frame above a surface, the support device comprising a support device cylinder to move the frame relative to the surface;
   a planting unit comprising:
      a cartridge for receiving the seed;
      a compression device coupled to the cartridge for holding the seed;
      a piston positioned in a facing relationship with the cartridge, the piston configured to push the seed out of the cartridge and into the surface; and
      a cylinder positioned in a facing relationship with the piston, the cylinder configured to move the piston; and
   a control device for controlling operation of the cylinder and the support device cylinder, the control device comprising a data storage device and an electronic data processor, the data storage device configured for storing instructions that are executable by the electronic data processor to cause the electronic data processor to determine a cylinder output and provide a cylinder signal to the cylinder to move the piston and to determine a support device cylinder output and provide a support device cylinder signal to the support device cylinder to move the piston up or down relative to the surface to achieve a desired planting depth.

4. The encapsulated seed planting device of claim 3, further comprising a sensor in communication with the control device, the sensor configured for measuring the height of the piston relative to the surface.

5. The encapsulated seed planting device of claim 3, wherein the cartridge comprises a receiving portion for receiving the seed and an exit portion for the piston to remove the seed from the cartridge.

6. The encapsulated seed planting device of claim 3, wherein the planting unit is a first planting unit, the encapsulated seed planting device further comprising a second planting unit.

7. The encapsulated seed planting device of claim 3, wherein the compression device comprises a spring.

8. The encapsulated seed planting device of claim 3, wherein the cartridge is configured to receive more than one seed.

9. The encapsulated seed planting device of claim 3, wherein the cartridge is configured to orient the seed so the planting unit can plant the seed in a desired orientation.

10. The encapsulated seed planting device of claim 3, further comprising a guide in a facing relationship with the compression device.

11. The encapsulated seed planting device of claim 6, wherein the first planting unit and the second planting unit are positioned colinearly in a direction of travel and plant seeds in the same row.

12. A method for controlling an encapsulated seed planting device, the encapsulated seed planting device comprising a frame, a support device for supporting the frame above a surface, the support device comprising a support device cylinder to move the frame relative to the surface, a planting unit comprising a cartridge for receiving the seed, a compression device coupled to the cartridge for holding the seed, a piston positioned in a facing relationship with the cartridge, the piston configured to push the seed out of the cartridge and into the surface, and a cylinder positioned in a facing relationship with the piston, the cylinder configured to move the piston, the method comprising:

determining a cylinder output;

providing a cylinder signal to the cylinder to move the piston;

determining a support device cylinder output; and providing a support device cylinder signal to the support device cylinder to move the piston up or down relative to the surface to achieve a desired planting depth.

\*  \*  \*  \*  \*